United States Patent
Deb et al.

(10) Patent No.: US 12,271,090 B2
(45) Date of Patent: Apr. 8, 2025

(54) FUNCTIONAL AND TRANSPARENT GEL ELECTROLYTE SYSTEM AND FAST SWITCHING ELECTROCHROMIC/ELECTROCHEMICAL DEVICES THEREOF

(71) Applicant: COUNCIL OF SCIENTIFIC AND INDUSTRIAL RESEARCH AN INDIAN REGISTERED BODY INCORPORATED UNDER THE REGN. OF SOC. ACT (ACT XXI OF 1860), New Delhi (IN)

(72) Inventors: Biswapriya Deb, Pappanamcode Thiruvananthapuram (IN); Ajayaghosh Ayyappanpillai, Pappanamcode Thiruvananthapuram (IN); Ranjana Venugopal, Pappanamcode Thiruvananthapuram (IN); Gayathri Prabhu Thulichal Ganesh Prabhu, Pappanamcode Thiruvananthapuram (IN); Sreejith Shankar Pooppanal, Pappanamcode Thiruvananthapuram (IN)

(73) Assignee: COUNCIL OF SCIENTIFIC AND INDUSTRIAL RESEARCH AN INDIAN REGISTERED BODY INCORPORATED UNDER THE REGN. OF SOC. ACT (ACT XXI OF 1860), New Delhi (IN)

(*) Notice: Subject to any disclaimer, the term of this patent is extended or adjusted under 35 U.S.C. 154(b) by 683 days.

(21) Appl. No.: 17/595,970

(22) PCT Filed: Feb. 15, 2021

(86) PCT No.: PCT/IN2021/050143
§ 371 (c)(1),
(2) Date: Nov. 30, 2021

(87) PCT Pub. No.: WO2021/161348
PCT Pub. Date: Aug. 19, 2021

(65) Prior Publication Data
US 2022/0244607 A1     Aug. 4, 2022

(30) Foreign Application Priority Data
Feb. 14, 2020 (IN) .............................. 202011006474

(51) Int. Cl.
| | | |
|---|---|---|
| G02F 1/1523 | (2019.01) | |
| G02F 1/15 | (2019.01) | |
| G02F 1/1506 | (2019.01) | |
| G02F 1/1516 | (2019.01) | |
| G02F 1/1524 | (2019.01) | |
| G02F 1/153 | (2006.01) | |
| G02F 1/155 | (2006.01) | |

(52) U.S. Cl.
CPC .......... G02F 1/1525 (2013.01); G02F 1/1506 (2013.01); G02F 1/1516 (2019.01); G02F 1/1524 (2019.01); G02F 1/1533 (2013.01); G02F 1/155 (2013.01); *G02F 2001/164* (2019.01)

(58) Field of Classification Search
CPC .... G02F 1/1525; G02F 1/1524; G02F 1/1516; G02F 1/1506; G02F 1/1533; G02F 1/155; G02F 2001/164
See application file for complete search history.

(56) References Cited

U.S. PATENT DOCUMENTS

| | | |
|---|---|---|
| 3,521,941 A | 7/1970 | Deb et al. |
| 3,708,220 A | 1/1973 | Meyers et al. |
| 3,995,943 A | 12/1976 | Jasinski |
| 4,106,862 A | 8/1978 | Bayard |
| 4,175,837 A | 11/1979 | Inami et al. |
| 5,229,040 A | 7/1993 | Desbat et al. |
| 2003/0165743 A1 | 9/2003 | Horikiri et al. |
| 2010/0267849 A1 | 10/2010 | Lee et al. |
| 2012/0125422 A1 | 5/2012 | Kang et al. |
| 2015/0140055 A1 | 5/2015 | Schlenoff |

FOREIGN PATENT DOCUMENTS

| | | |
|---|---|---|
| CN | 110581315 A | 12/2019 |
| EP | 1475656 A1 | 11/2004 |
| JP | 2009175718 | 8/2009 |
| JP | 2019506699 | 3/2019 |
| WO | WO-2009130316 A1 | 10/2009 |
| WO | WO-2018213411 A1 | 11/2018 |

OTHER PUBLICATIONS

"European Application No. 21753477.5, Extended European Search Report dated Jan. 26, 2024", (Jan. 26, 2024), 10 pgs.
"India Application No. 202011006474, Office Action mailed Apr. 20, 2023", (Apr. 20, 2023), 5 pgs.
"Japanese Application No. 2022-506441, Notice of Reasons for Refusal dated Jul. 20, 2023", (Jul. 20, 2023), 8 pgs.
"Japanese Application No. 2022-506441, Office Action dated Mar. 20, 2023", (Mar. 20, 2023), 13 pgs.
"International Application No. PCT/IN2021/050143, International Search Report and Written Opinion mailed Apr. 27, 2021", (Apr. 27, 2021), 10 pgs.

(Continued)

*Primary Examiner* — C Melissa Koslow
(74) *Attorney, Agent, or Firm* — Schwegman Lundberg & Woessner, P.A.

(57) ABSTRACT

A transparent gel electrolyte comprising a polymeric gelling agent, a lithium or ammonium salt ionic conductor, molecular iodine and a solvent selected from water, water and DMSO or water and alcohol. This electrolyte can be used in electrochromic devices.

10 Claims, 5 Drawing Sheets
(4 of 5 Drawing Sheet(s) Filed in Color)

(56) References Cited

OTHER PUBLICATIONS

Arvind and Agrawal, "Structural, thermal and electrical characterizations of PVA:DMSO:NH4SCN gel electrolytes", Solid State Ionics (2007), vol. 178, May 31, 2007, pp. 951-958, (May 31, 2007), 951-958, abstract only.

Aziz, et al., "PVA based gel polymer electrolytes with mixed iodide salts (KI and Bu4NI) for dye-sensitized solar cell application", Electrochimica Acta, vol. 182, Sep. 9, 2015, pp. 217-223, (Sep. 9, 2015), 217-223, abstract only.

Chodankar, et al., "Ionically Conducting PVA-LiClO4 Gel Electrolyte for High Performance Flexible Solid State Supercapacitors", Journal of Colloid and Interface Science (2015), vol. 460, Dec. 15, 2015, pp. 370-376, (Dec. 15, 2015), 370-376, abstract only.

FUNCTIONAL AND TRANSPARENT GEL ELECTROLYTE SYSTEM AND FAST SWITCHING ELECTROCHROMIC/ELECTROCHEMICAL DEVICES THEREOF

PRIORITY CLAIM TO RELATED APPLICATIONS

This application is a U.S. national stage filing under 35 U.S.C. § 371 from International Application No. PCT/IN2021/050143, filed on 15 Feb. 2021, and published as WO2021/161348 on 19 Aug. 2021, which claims the benefit under 35 U.S.C. 119 to India Application No. 202011006474, filed on 14 Feb. 2020, the benefit of priority of each of which is claimed herein, and which applications and publication are hereby incorporated herein by reference in their entirety.

FIELD OF THE INVENTION

The present invention relates to a transparent gel electrolyte system useful as a thin film/gel in electrochemical or electrochromic cells and devices. Particularly, the present invention relates to the sandwich cell devices fabricated using these gel electrolytes. The disclosed electrolyte and the device are mechanically and thermally stable, offering sufficiently long periods of stable operation.

BACKGROUND AND PRIOR ART OF THE INVENTION

Smart material R&D is largely driven by the increasing demand for smart technology applications such as smart switchable windows and related optoelectronic devices. Electrochromic materials are a family of 'smart materials' that can change their optical properties under the application of an electric voltage. The tunable optical properties of electrochromic materials directly reflect in the light and heat transmission properties of the surface, leading to efficient indoor lighting and cooling, aesthetics as well as glare reduction. For instance, the dynamic modulation of heat and light transmission through these smart windows could be directly correlated to the energy consumption in maintaining the indoor temperature and visibility; thus a magnanimous portion of domestic energy consumption could be reduced.

Electrolytes, a common component in all electrochemical processes, is a key component in electrochromic devices. The functions of an electrolyte in an electrochromic device includes charge balance or electroneutrality, conductivity and ionic mobility. In an electrolyte, charge transport occurs via the motion of positive and negative ions and its conductivity has a contribution from every ion present. The use an electrolyte in ECDs demands high ionic conductivity, electronic insulation, transparency in the wavelength range, wide electrochemical window of operation and low volatility. Thus, electrolytes are used as the ionic conductor between the two electrodes and separate the cathode and anode thereby avoiding direct electrical contact and permitting mutual ionic exchanges.

Several classes of electrolytes have been reported. Typically, aqueous electrolytes, organic liquid electrolytes, ionic liquids, gel electrolytes and solid polymer electrolytes are commonly used in ECDs. Though purely liquid electrolytes provide better ionic conductivity and faster switching, they suffer from low viscosity, leakage and stability and hence gel or solid electrolytes are preferred in ECDs. These are of three major types: (i) polymers mixed with ion conductors in solvent-free states (Eg: PEO/ionic salts), (ii) polymer/gel matrices swollen with aqueous/organic electrolyte solutions (PMMA/PC/ACN/LiClO$_4$) and (iii) ionic species mobile within a polymer matrix (Nation).

PEO or PEO modified polymers are one of the most commonly used class of matrices for solid/gel electrolytes in ECDs (Reference may be made to: (a) Quartarone, E.; et al. *Solid State Ionics,* 1998, 110, 1-14; (b) Kim, Y. T.; et al. *Solid State Ionics,* 2002, 149, 29-37; (c) Plancha, M. L.; et al. *J. Electroanal. Chem.,* 1998, 442, 91-7; (d) Serraino, F. F.; et al. *J. Eur. Ceram. Soc.,* 2004, 24, 1385-1387; (e) Guinot, S.; et al. *Electrochim. Acta.* 1998, 43, 1163-1170; (f) Rhodes, C. P.; et al. *Solid State Ionics,* 1999, 121, 91-99. Polyether, polyester, nitrogen/sulphur containing polymers, olefin halide polymers, siloxane derived polymers, etc. have been used to dissolve especially Li$^+$ salts without effective crystallization (Reference may be made to: (a) Gong, Y.; et al. *Chinese J. Chem.* 2007, 25, 1743-1747; (b) Gong, Y.; et al. *Chinese J. Polym. Sci.,* 2008, 26, 91-97; (c) Zhang, S.; et al. *J. Functional Mater.,* 2006, 37, 442-445; (d) Zhang, S.; et al. *J. Appl. Polym. Sci.,* 2007, 106, 4091-4097; (e) Bohnke, O.; et al. *J. Electrochem. Soc.,* 1992, 139, 1862-1865; Agnihotry, S. A.; et al. *Electrochim. Acta,* 1999, 44, 3121-3126; (f) Yang, D.; et al. *Chinese J. Polymer Sci.,* 2008, 26, 375-380; (g) Erickson, M.; et al. *Electrochim. Acta,* 2003, 48, 2059-2063; (h) Ramesh. S.; et al. *Solid State Ionics,* 2002, 148, 483; (i) Magistris, A.; et al. *Solid State Ionics,* 2002, 152, 347-354; (j) Liang, W. J.; et al.; *Polymer,* 2004, 45, 1617-1626; (k) Kraft. A.; et al. *Solar Energy Mater. Solar Cells,* 2006, 90, 469-476; (1) Kobavashi, N.; et al. *Electrochim. Actra,* 2003, 48, 2323-7). Salts of lithium or ammonium cations have been used as ionic conductors in most of these polymer based electrolytes. The polymer does not contribute to the ionic conductance, however the gel electrolyte, due to the presence of ionic conductors that are freely mobile in the polymer matrix, are generally as conductive as the liquid electrolytes.

Several patents have educated the development of electrolytes for use in ECDs. International publication WO 2009130316 (Georen, et al.) presented a three-component gel electrolyte system for laminated electrochromic devices. The described electrolyte consisted of an amide based solvent, an ionisable lithium salt and an optically transparent polymer. U.S. Pat. No. 5,229,040 (Deshat, et al.) has disclosed the use of colloidal materials comprising of an ionomer, a polar solvent and a plasticizing polymer, which conduct alkaline cations and their use as electrolytes in electrochromic devices. US 20030165743 proposed self-assembling compounds consisting of hydroxyl, amino, amide, carboxyl and ammonium groups, capable of gelating room temperature liquid electrolytes via non-covalent interactions, as gel electrolytes for ECDs. U.S. Pat. No. 3,521,941 discloses an electrochromic device consisting of a thin layer of active material (Eg: metal oxide) and an ion conductor as a permeable insulator and electrolyte. Polymers and metal oxides, sulfides, fluorides, and nitrides were proposed as suitable electrolyte materials. Gel electrolytes based on sulphuric acid have been shown to impart fast switching characteristics to WO$_3$ and MoO$_3$ films in U.S. Pat. No. 3,708,220. U.S. Pat. No. 4,175,837 suggests the application of salts of sodium and lithium as ion conductors in electrolytes. However, the used of acid electrolytes have also been shown to result in corrosion of metal oxide based electrochromic layers. U.S. Pat. Nos. 4,106,862 and 3,995,943 proposed the use of metal (Ag, Zr) based electrolytes, however, these are highly expensive to produce.

Abbreviations Used

ECD—Electrochromic device
PMMA—Polymethyl methacrylate
PC—Propylene carbonate
ACN—Acetonitrile
PVA—Polyvinyl alcohol
DMSO—Dimethyl sulfoxide
SEM—Scanning electron microscope
nm—Nanometer
FTO—Fluorine doped Tin Oxide
CE—Coloration efficiency

OBJECTIVES OF THE INVENTION

Main object of the present invention is to provide transparent gel electrolyte system with better performance compared to conventional gel electrolytes in electrochromic devices.

Another objective of the present invention is to provides a high performing gel electrolyte and laminated ECDs with improved performance using this electrolyte.

Yet another objective of the present invention is to fabricate laminated electrochromic devices with better switching speeds and coloration efficiencies using the functional gel electrolyte and an active electrochromic layer.

SUMMARY OF THE INVENTION

In an aspect of the present invention there is provided a transparent gel electrolyte comprising: (i) a polymeric gelling agent; (ii) a solvent; (iii) an additive; and (iv) an ionic conductor; wherein the weight composition ratio of solvent, polymeric gelling agent, additive and ionic conductor is in the range 20:2:1:2 to 2000:200:1:20; the solvent is selected from the group consisting of water, a mixture of water and alcohol (R—OH), and water and DMSO wherein R is $C_{1-12}$ alkyl: the molecular weight of the polymeric gelling agent is in the range of 89,000-98,000: the ionic conductor is selected from a salt of lithium or ammonium cations; and the additive is molecular iodine.

In another aspect of the present invention, there is provided a process for the synthesis of the transparent gel electrolyte comprising the steps of: mixing solvent, a polymeric gelling agent, an additive and an ionic conductor at 2000:200:1:20 weight composition followed by heating at temperature in the range of 60 to 90° C. for a period in the range of 5 to 24 hrs to obtain a mixture;
  cooling the mixture as obtained in step (i) followed by drying by freeze thawing (thrice for 1 h each), storing at room temperature in the range of 25 to 30° C.:

In yet another aspect of the present invention, there is provided a sandwich cell device comprising: two conducting oxide coated electrode substrates having electrically conductive surfaces; an electrochromic active layer comprising of a redox active material having a predefined color, reversibly changeable upon subjecting to an electric field and; a transparent gel electrolyte as disclosed above sandwiched between the said substrates separated by an insulating tape as a spacer; wherein the active layer is electrophoretically deposited oxides of first row transition metals with a general formula $MO_x$, where M is tungsten, vanadium or nickel and x>0, the said active layer having a thickness of 100 nm-1200 nm: the active layer is spray or dip or spin coated oxides of first row transition metals with a general formula $MO_x$, where M is tungsten, vanadium or nickel and x>0, the said active layer having a thickness of 500 nm-1200 nm: the active layer is spray or dip or spin coated metal-bipyridine, or metal-terpyridine complexes, with a general formula $[M(py)_n]^{m+}X^-$ or $[M(py)_n]^{m+}mX^-$ and their coordination polymers, where py denotes a coordinating ligand as in bipyridine or terpyridine; wherein M is independently selected from the group consisting of Fe, Os, Ru, Ni, Co, Cu; n and m are integers, each independently selected from 0-3, essentially n, m>0; X is an anion, independently selected from the group consisting of halides ($F^-$, $Cl^-$, $Br^-$, $I^-$), bis(trifluromethane)sulphonamides $[N(CF_3SO_2)_2]$, perchlorates ($ClO_4^-$), hexafluorophosphate ($PF_6^-$), and $CF_3(CF_2)_nSO_3^-$ (triflates); and the said active layer having a thickness of 60 nm-1000 nm.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
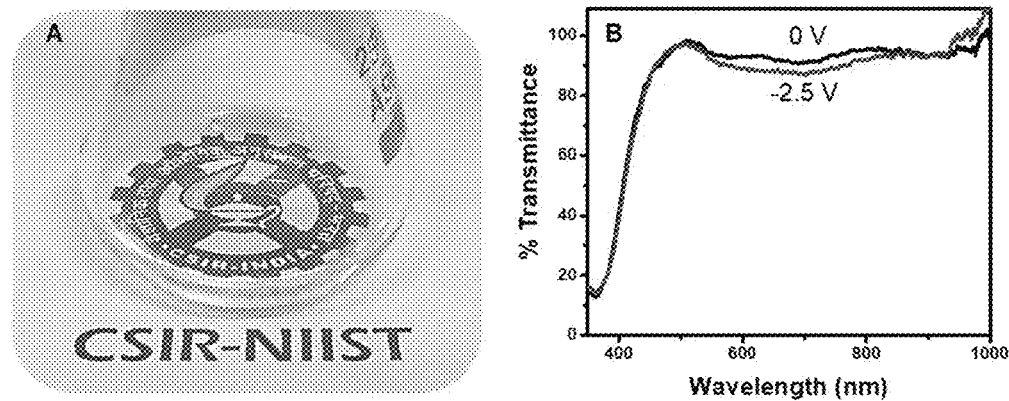
FIG. 1 illustrates the as prepared gel electrolyte with >90% transparency and negligible transmittance change in the potential window 0-2.5 V. (A) shows a photograph of the as-prepared gel electrolyte and (B) shows the transmittance spectrum for the electrolyte at 0 V and −2.5 V.
Figure 2:
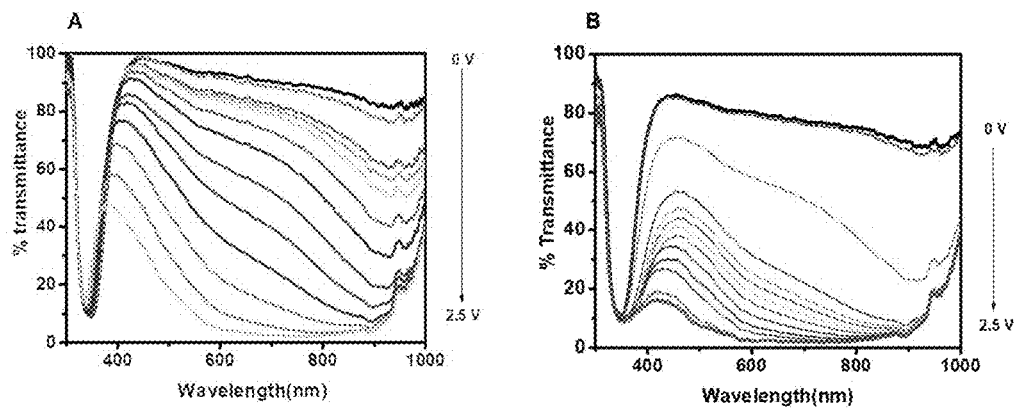
FIG. 2 illustrates the effect of iodine as molecular additive on the electrochromic switching of the ECD fabricated from $WO_3$ using (A) the gel electrolyte comprising the molecular additive and (B) the conventional gel electrolyte devoid of the molecular additive, in the potential window 0-2.5 V. PVA with a molecular weight 89,000-98,000 was used in the preparation of both the electrolytes. The blank experiment in air provided the base line.
Figure 3:
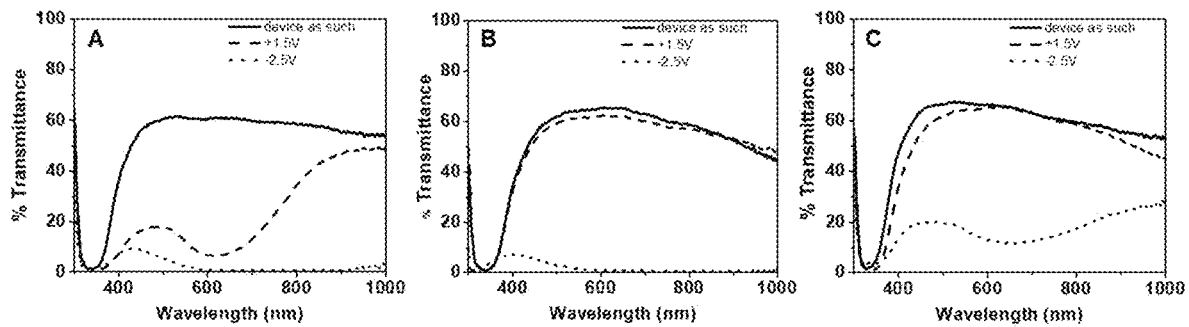
FIG. 3 illustrates the comparative electrochromic switching performance of the ECDs fabricated from $WO_3$ based on the molecular weight of PVA (A) 13,000-25,000, (B) 89,000-98,000 and (C) 1,25,000. (A) was found to be irreversible and (B) was found to exhibit better characteristics as compared to (C). From these experiments, PVA with a molecular weight 89.000-98,000 was identified for further experiments. The blank experiment in air provided the base line.
Figure 4:
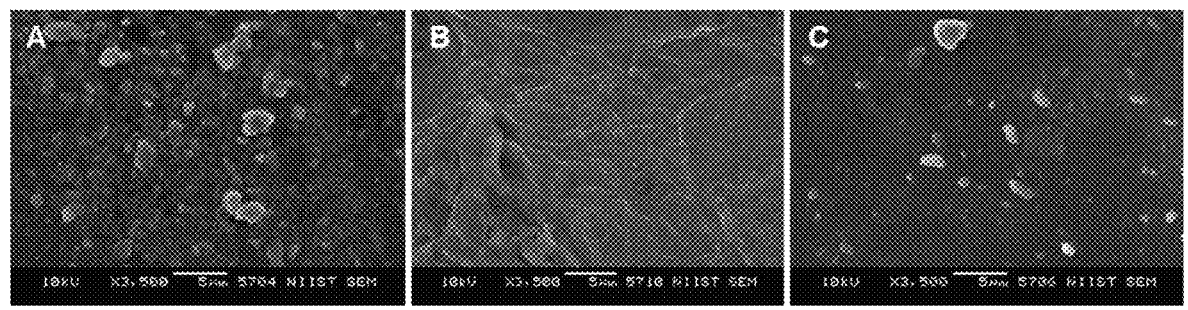
FIG. 4 illustrates the SEM images of the free standing film of the gel electrolytes prepared using PVA of molecular weight (A) 13,000-25,000, (B) 89,000-98,000 and (C) 1,25,000.
Figure 5:
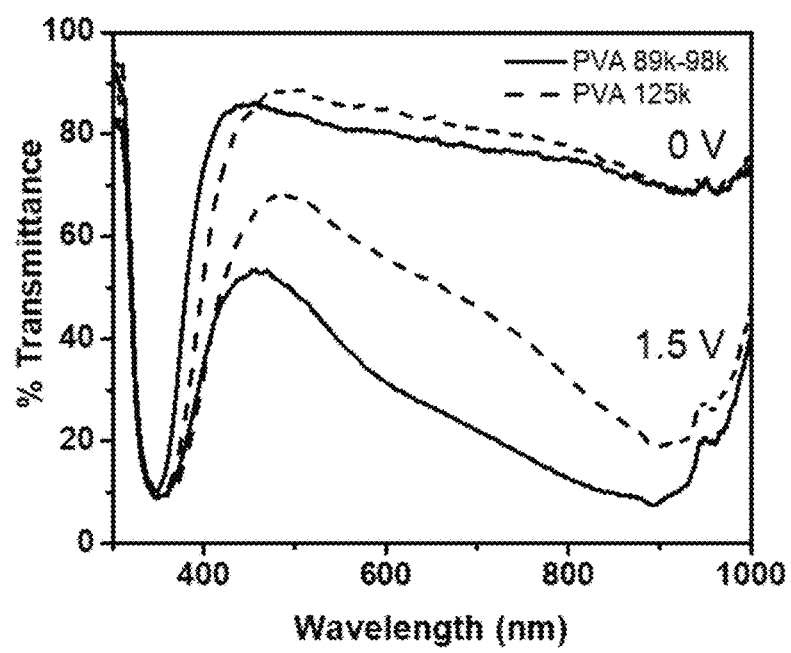
FIG. 5 illustrates the difference in the switching performance of the ECD fabricated from $WO_3$ using the functional gel electrolyte prepared using PVA of different molecular weights at an applied potential window of 0-1.5 V (green: MW=89,000-98,000; red: MW=1,25,000). The blank experiment in air provided the base line.
Figure 6:
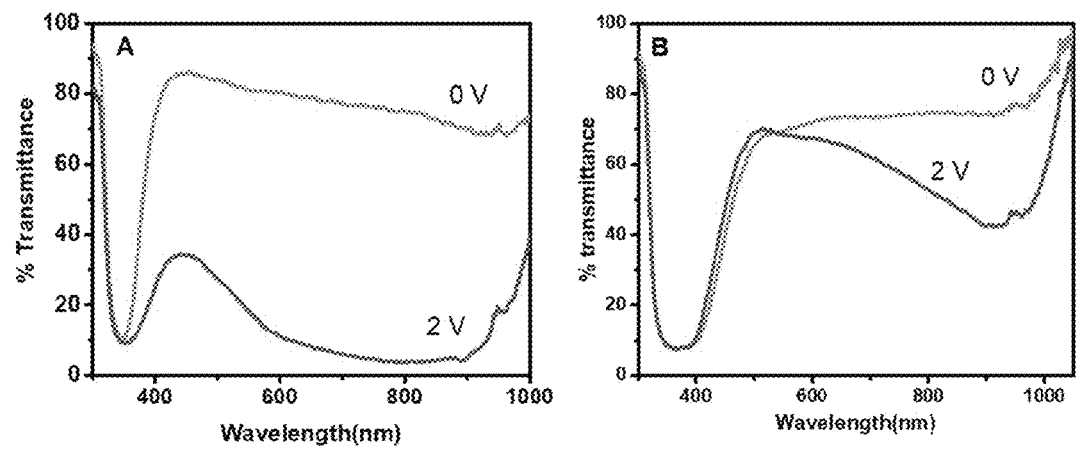
FIG. 6 illustrates the effect of solvent (A: water Vs B: DMSO) on the switching performance of the ECD fabricated from $WO_3$ using the functional gel electrolyte. The molecular additive was present in both the electrolyte systems.
Figure 7:
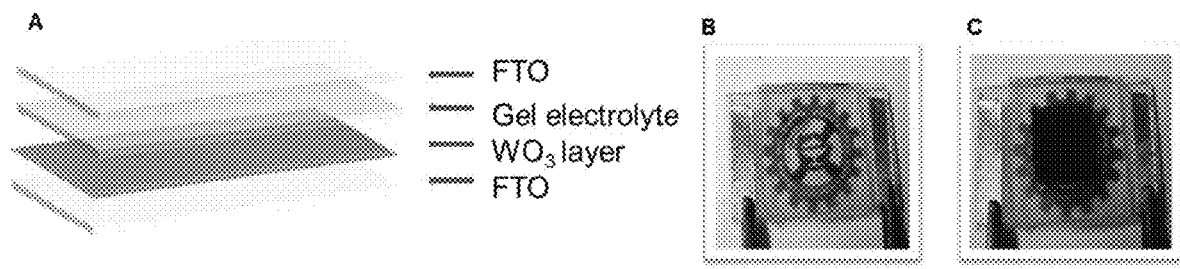
FIG. 7 illustrates (A) the device fabrication and architecture in a sandwich cell configuration and (B, C) the photographs of the ECD fabricated from $WO_3$ using the functional gel electrolyte containing the additive: (B) as fabricated, (C) after applying a potential of −2.5 V.
Figure 8:
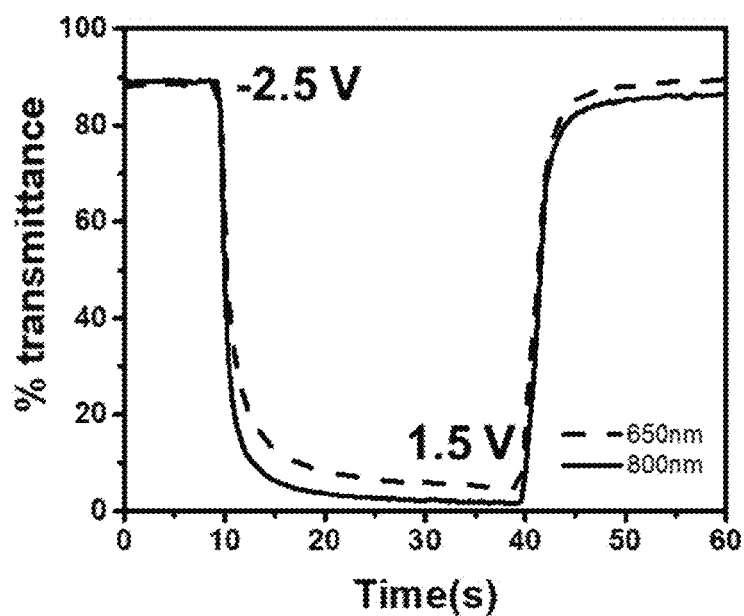
FIG. 8 illustrates the reversible switching performance of the ECD fabricated from $WO_3$ using the functional gel electrolyte containing the additive when subjected to the potential window −2.5 V-1.5 V, recorded at two different wavelengths (dashed: 650 nm, solid: 800 nm). Almost complete recovery of coloration and bleaching was observed upon application of −2.5V and 1.5 V respectively.
Figure 9:
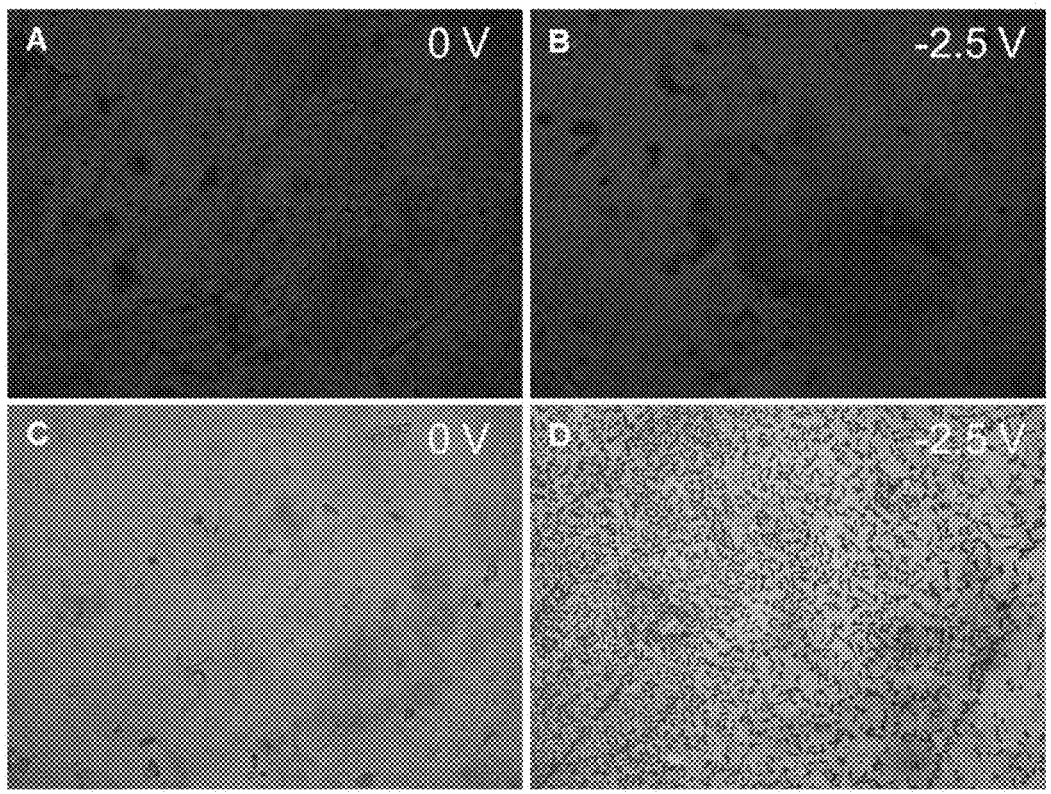
FIG. 9 illustrates the polarized light microscope images of the ECD fabricated from $WO_3$ using (A, B) the conventional gel electrolyte devoid of the additive and (C, D) the functional gel electrolyte containing the additive.
Figure 10:
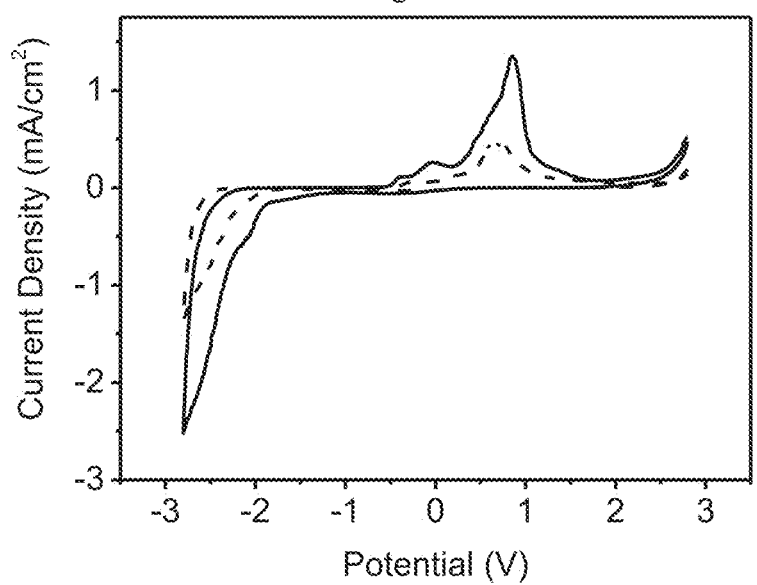
FIG. 10 illustrates the better electrochemical response the ECD fabricated from $WO_3$ using the functional gel electrolyte containing the additive (solid curve) as compared to the ECD fabricated from $WO_3$ using conventional gel electrolyte devoid of the additive (dashed curve) under otherwise identical conditions.
Figure 11:
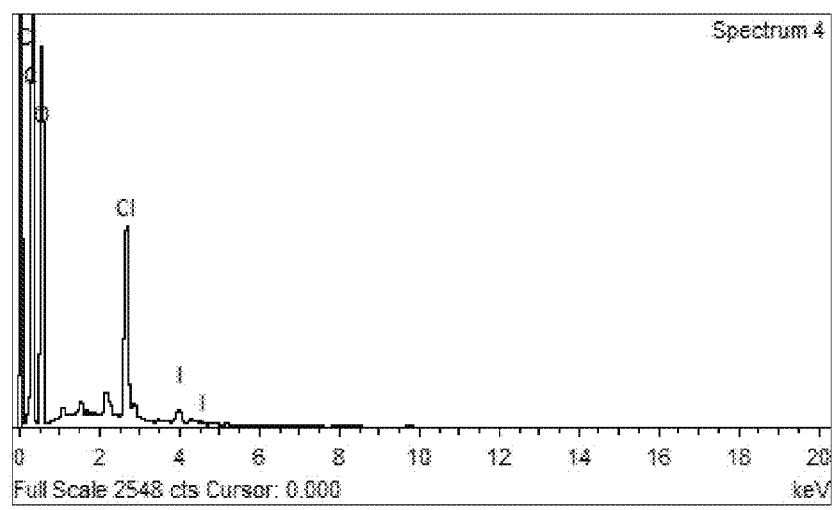
FIG. 11 illustrates the ESD spectrum of the functional gel electrolyte obtained on SEM confirming the presence of iodine.
Figure 12:
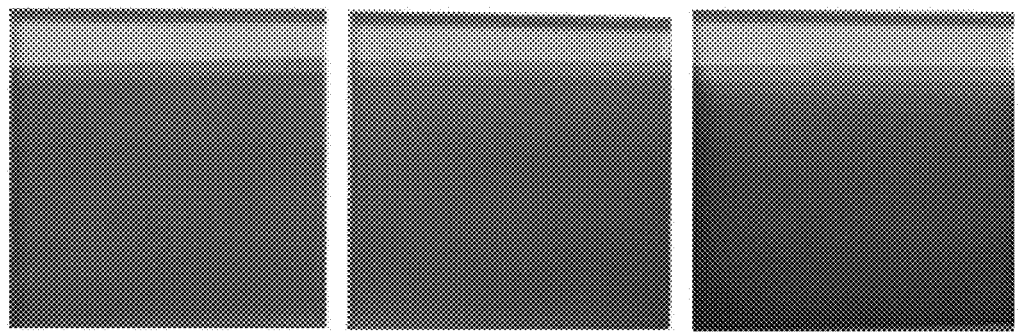
FIG. 12 illustrates the photographs of the electrochromic films of the metallosupramolecular polymers on 3 cm×3 cm FTO substrates.
Figure 13:
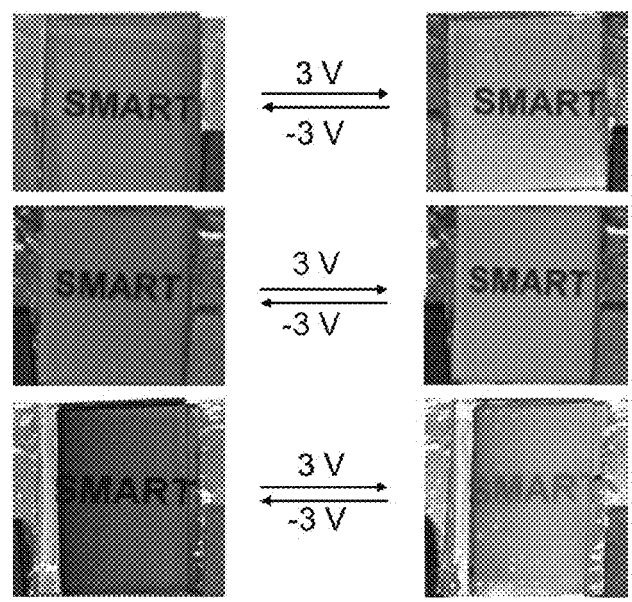
FIG. 13 illustrates the electrochromic devices constructed using the electrochromic films of the metallosupramolecular polymers on 3 cm×3 cm FTO substrates.

Those skilled in the art will be aware that the present disclosure is subject to variations and modifications other than those specifically described. It is to be understood that the present disclosure includes all such variations and modifications. The disclosure also includes all such steps, features, compositions, and compounds referred to or indicated in this specification, individually or collectively, and any and all combinations of any or more of such steps or features.

a. Definitions

For convenience, before further description of the present disclosure, certain terms employed in the specification, and examples are delineated here. These definitions should he read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may he included. It is not intended to be construed as "consists of only". Throughout this specification, unless the context requires otherwise the word "comprise", and variations such as "comprises" and "comprising", will be understood to imply the inclusion of a stated element or step or group of element or steps but not the exclusion of any other element or step or group of element or steps.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature in the range of 60-90° C. should be interpreted to include not only the explicitly recited limits of about 60° C. to 90° C. but also to include sub-ranges, such as 61-89° C., and so forth, as well as individual amounts, within the specified ranges, such as 68.2° C., 70.5° C. and so on.

The present invention discloses a modified gel electrolyte system for electrochemical cells. The invention also discloses the fabrication of fast switching and efficient electrochromic devices in the form of laminated sandwich cells employing the aforementioned gel electrolyte and transparent conducting oxide coated substrates.

The electrolyte comprises of a suitable solvent, a polymeric gelling agent, an additive and an ionic conductor. The role of the polymer is to plasticize or gelate the ionic conductor for stable and efficient operation at room temperature. The conventional gel electrolyte is constituted by a polymer, solvent and an ionic conductor.

In an embodiment of the present invention there is provided a transparent gel electrolyte comprising: a polymeric gelling agent; a solvent; an additive; and an ionic conductor; wherein the weight composition ratios of solvent, polymeric gelling agent, additive and ionic conductor is in the range 20:2:1:2 to 2000:200:1:20; the solvent is selected from the group consisting of water, a mixture of water and alcohol (R—OH), and water and DMSO wherein R is $C_{1-12}$ alkyl; the molecular weight of the polymeric gelling agent is in the range of 89,000-98,000; the ionic conductor is selected from a salt of lithium or ammonium cations; and the additive is molecular iodine.

In an embodiment of the present invention, there is provided a transparent gel electrolyte as disclosed herein, wherein the amount of alcohol or DMSO does not exceed 25% of the amount of water.

In an embodiment of the present invention, there is provided a transparent gel electrolyte as disclosed herein, wherein the polymeric gelling agent used is poly-vinyl alcohol (PVA).

In an embodiment of the present invention, there is provided a transparent gel electrolyte as disclosed herein, wherein the anion of the ionic conductor is selected independently from the group consisting of halides ($F^-$, $Cl^-$, $Br^-$, $I^-$), bis(trifluoromethane)sulphonamides [$N(CF_3SO_2)_2$], perchlorates ($ClO_4^-$), alkoxides (OR), carboxylates ($RCOC^-$), hexafluorophosphate ($PF_6^-$), and $CF_3(CF_2)_nSO_3^-$ (triflates), wherein R is of $C_{1-12}$ alkyl.

In an embodiment of the present invention there is provided a transparent gel electrolyte as disclosed herein, wherein the additive is molecular iodine. In another embodiment of the present invention as disclosed herein, wherein the additive is added to the electrolyte system that imparts better electrochromic performance, the said additive being added in prescribed amounts at defined weight composition of all the components, and the solvent is water or a mixture of water/alcohol (R—OH), and water/DMSO and R is $C_{1-20}$ alkyl allyl, the polymeric gelling agent is poly-vinyl alcohol (PVA), the ionic conductor is a salt of lithium or ammonium cations and the additive is molecular iodine; the solvent, polymeric gelling agent, additive and ionic conductor comprises a weight composition ratios of 2000:200:1:20.

In an embodiment of present invention there is provided a process for the synthesis of the transparent gel electrolyte comprising the steps of: (i) mixing solvent, a polymeric gelling agent, an additive and an ionic conductor at 2000:200:1:20 weight composition ratios followed by heating at temperature in the range of 60 to 90° C. for a period in the range of 5 to 24 hrs to obtain a mixture; (ii) cooling the mixture as obtained in step (i) followed by drying by freeze thawing (thrice for 1 h each), and: (iii) storing at room temperature in the range of 25 to 30° C.

In an embodiment of the present invention there is provided a sandwich cell device comprising: two conducting oxide coated electrode substrates having electrically conductive surfaces; and an electrochromic active layer comprising of a redox active material having a predefined color, reversibly changeable upon subjecting to an electric field; and a transparent gel electrolyte sandwiched between the electrode substrates separated by an insulating tape as a spacer; wherein the electrochromic active layer is electrophoretically deposited oxides of first row transition metals with a general formula $MO_x$, where M is tungsten, vanadium or nickel and x>0 having a thickness of 100 nm-1200 nm; and/or the electrochromic active layer is spray or dip or spin coated oxides of first row transition metals with a general formula $MO_x$, where M is tungsten, vanadium or nickel and x>0 having a thickness of 500 nm-1200 nm; the active layer is spray or dip or spin coated metal-bipyridine, or metal-terpyridine complexes, with a general formula $[M(py)_n]^{m+}mX^-$ or $[M(py)_n]^{m+}mX^-$ and their coordination polymers, where py denotes a coordinating ligand as in bipyridine or terpyridine; wherein M is independently selected from the group consisting of Fe, Os, Ru, Ni, Co, Cu; n and m are integers, each independently selected from 0-3, essentially n, m>0; X is an anion, independently selected from the group consisting of halides ($F^-$, $Cl^-$, $Br^-$, $I^-$), bis(trifluoromethane)sulphonamides $[N(CF_3SO_2)_2]$, perchlorates ($ClO_4^-$), alkoxides (OR), carboxylates ($RCOO^-$), hexafluorophosphate ($PF_6^-$), and $CF_3(CF_2)_nSO_3^-$ (triflatesr having a thickness of 60 nm-1000 nm.

In an embodiment of the present invention, there is provided a sandwich cell device as disclosed herein, wherein the substrates used are selected from the group consisting of doped/undoped glass. TCO (transparent conducting oxide) coated glass, silicon, quartz, metal, metal oxide, polymer, mica, clay, zeolite, plastic, ceramic, alumina, steel or any conducting substrate, in the form of sheets, columns or plates.

In an embodiment of the present invention, there is provided a sandwich cell device as disclosed herein, wherein the electrochromic active layer further comprises a monolayer of the same or different redox active materials or plurality of layers with the same or different redox active materials, the redox active materials are independently chosen from the oxides of tungsten, vanadium or nickel, or metal-bipyridine, or metal-terpyridine complexes or their coordination polymers sandwiched between the conductive substrates along with the gel electrolyte.

In an embodiment of the present invention there is provided a sandwich cell device as disclosed herein, wherein said device exhibit coloration efficiency is in the range of 200-2000 cm$^2$/C and a switching speed of 1-3 s.

In an embodiment of the present invention there are provided smart windows, smart mirrors, e-papers, smart displays, helmet visors, smart ophthalmic glasses, optical data storage devices, glare reduction set-ups, heat and light transmission modulators, and integrated charge storage devices comprising a sandwich cell device as disclosed herein.

In an embodiment the present invention provides an electrochromic element that on application of sufficient electric potential changes color, the electrochromic element comprising two transparent conducting oxide coated electrodes, an electrochromic active layer, and the disclosed gel electrolyte system, the electrochromic active layer comprising independently or in combinations of transition metal oxides with a general formula $MO_x$, where in M is selected from tungsten, vanadium or nickel and x>0 or metal ligand systems wherein the ligand is chosen independently from terpyridine, bipyridine or their derivatives and the said metal is cationic and chosen independently from Fe(II), Co(II), Ni(II), Cu(II) or Mn(II).

In an embodiment the present invention provides laminated ECDs with an improved coloration efficiency and faster switching performance at room temperature.

Upon extensive investigations related to the composition of gel electrolytes with regard to their performance in assisting electrochromic switching, it has been found that addition of certain compounds (referred to as "additives" hereafter) improves the switching performance of electrochromic devices.

The gel electrolyte in the present invention allowed a broader electrochemical window and hence the voltage of operation, high transparency (>90%), faster electrochromic switching and almost two-fold efficiency. The gel electrolyte according to the present invention comprises of a gelating agent (a polymer), an ionic conductor (ammonium or lithium salts), a solvent (water or water-organic mixture) and an additive.

The present invention intends to offer a greener electrolyte composition and water was preferred as the solvent of choice. The composition of the solvent could be varied, in exceptional environments only if required, by adding small amounts of polar organic solvents, the said organic solvents being DMSO or alcohols, up to a maximum of 25% of the total volume of water.

The other vital constitutional element in the present invention is the polymeric gelling agent. Though there may be no limitation to the choice of the polymer, except for water compatibility, initial results suggested poly-vinyl alcohol (referred to as "PVA" hereafter) to be an efficient gelator. It is, however, preferred that the polymer has some groups with high polarity associated with its backbone. The present invention intends to disclose the selection of the polymeric gelling agent (PVA) with regard to its molecular weight and the experimentally identified PVA had a molecular weight specifically in the range 89,000-98,000. The PVA-based electrolytes with lower molecular weight was found to result in irreversible electrochromic switching under the experimental conditions. Free standing electrolyte films with better morphologies was obtained using PVA having the identified molecular weight, as evident from SEM images.

The ionic conductor of the said gel electrolyte may be chosen independently from the ionic salts known to the art, viz, ammonium or lithium salts. The anions may be selected from halides ($F^-$, $Cl^-$, $Br^-$, $I^-$), bis(trifluoromethane)sulphonamides $[N(CF_3SO_2)_2]$, perchlorates ($ClO_4^-$), alkoxides (OR), carboxylates ($RCOO^-$), hexafluorophosphate ($PF_6^-$), and $CF_3(CF_2)_nSO_3^-$ (triflates), wherein R is alkyl.

Care was taken that the said additive, added in prescribed amounts at a defined weight composition of all the constituents, should not influence the conductivity, gelation or electronic insulation of the electrolyte. It has been found that molecular iodine to be the best additive with solvent, polymeric gelling agent, additive and ionic conductor in a weight composition ratios of 2000:200:1:20. The presence of all the elements in the prepared electrolyte was confirmed by elemental analysis using energy dispersive X-ray spectroscopy (EDS) on SEM.

In preparing the gel electrolyte of the present invention, the components were homogenized by mixing and heating at 90° C. for 24 hrs, then cooled and stored at room temperature. The gel electrolytes thus prepared is not limited for use in electrochromic devices alone, but for other electrochemical cells such as sensors or related devices.

The active materials for the fabrication of electrochromic devices is not specifically limited and may be chosen from known materials, the said materials being inorganic, organic or metal-organic. Inorganic metal oxides (with a general formula MO) as active materials to demonstrate the performance and the electrochromic films of the said materials could be fabricated on transparent conducting oxides via electrophoretic deposition or spray/dip/spin coating techniques.

One of the specific examples of the electrochromic cells in the present invention comprises of two FTO coated conductive electrodes and a layered structure comprising of $WO_3$ as the active material and the said gel electrolyte sandwiched between the electrodes, separated by an insulating tape as a spacer. The fabricated device allowed better electrochemical switching, fast coloration-bleaching cycles and high coloration efficiency as compared to devices employing conventional electrolytes. The experimentally determined response time for coloration for devices comprising of the said electrolyte was 1.6 s and that for a device with the conventional electrolyte (devoid of the additive) was 6.4 s. The corresponding bleaching response times were 1.2 s and 3.0 s respectively. The coloration efficiency ($\eta_{650\,nm}$) was also found to improve by two fold (211 cm$^2$/C Vs 112 cm$^2$/C) upon using the gel electrolyte disclosed in the present invention.

The present invention is also not specific to single or plurality of active layers and/or their thickness. The active materials may be chosen independently from the said metal oxides and thickness up to 1200 nm was found to be tolerant. However, the extent of influence of the additive depending on the thickness and materials of choice cannot be predicted and hence the thickness dependent magnitude of property change cannot be rigorously excluded.

Exclusive use of water as solvent in the gel electrolyte provided the best results in switching experiments, whereas use of DMSO as the solvent in the aforementioned weight composition resulted in similar performance parameters as a conventional gel electrolyte.

EXAMPLES

Following examples are given by way of illustration and therefore should not be construed to limit the scope of the invention.

Example 1. Synthesis of Conventional Gel Electrolyte

A mixture of polyvinyl alcohol (MW 89000; 500 mg), LiClO$_4$ (50 mg) in water (5 mL) was stirred at 90° C. for 24 h. The homogeneous viscous solution thus obtained was cooled to 25° C. [room temperature] to obtain the conventional gel electrolyte.

Example 2. Synthesis of Functional Gel Electrolyte

To a mixture of polyvinyl alcohol (MW 89000; 500 mg), LiClO$_4$ (50 mg) in water (5 mL) molecular iodine (2.5 mg) was added. The resulting mixture was stirred at 90° C. for 24 h. The homogeneous viscous solution thus obtained was cooled to 25° C. [room temperature] and dried by freeze thawing (thrice for 1 h each) to obtain the functional gel electrolyte.

Example 3. Preparation of Electrochromic Layer Using WO$_3$

An electrochromic layer comprising of porous WO$_3$ layer was prepared as follows. WO$_3$·H$_2$O powder was synthesized by 12 h reaction of W powder with H$_2$O$_2$. Initially, 5 g of W powder was dissolved in 60 mL of H$_2$O$_2$ (50%) under constant stirring for 24 h in an ice bath. The solution was then filtrated that resulted in a colorless transparent liquid. The excess hydrogen peroxide was decomposed by stirring the solution for 4 hours at 80° C. that changed the solution color to deep yellow; then covered and left for one week. Subsequent drying of this solution produced yellow colored tungsten oxide hydrate (WO$_3$·H$_2$O) powder. In the second step, 0.5 g of WO$_3$·H$_2$O powder was dissolved in 30 mL of 10% H$_2$O$_2$ by stirring until complete dissolution and a pale yellow colored solution was obtained.

Example 4. Fabrication of ECDs

The active FTO electrode was prepared by electrophoretic deposition of the solution prepared in example 3 using a current of 5 mA for 10 min or by spin/spray or dipcoating. The functional gel electrolyte was sandwiched in between the active electrode and a bare FTO glass. The device was sealed and connected to a voltage source for electrochromic investigations.

Example 5. Synthesis of 442, 2', 6', 2"-terpyridine-4'-yl) phenylboronic acid 3

To a solution of NaOH (4.8 g, 0.12 mol) in EtOH (80 mL), 4-Formylphenylboronic acid 2 (3.032 g, 0.02 mol) and 2-acetylpyridine 1 (5.39 g, 0.04 mol) were added. After stirring at room temperature for 24 h, aq. NH$_4$OH (28%, 75 mL) was added, and the resulting mixture was refluxed for 20 h. The mixture was cooled to room temperature, the solid was collected by filtration and was washed with CHCl$_3$ to give the product 3 as an off white solid. Yield: 4.686 g, 85%. $^1$H NMR (500 MHz, CDCl$_3$, 300 K) δ: 8.70-8.68 (m, 2H, tpy-113',5'), 8.65-8.62 (m, 4H, tpy-H6,6" and tpy-H3,3"), 8.00 (td, J=7.7, 1.8 Hz, 2H, tpy-H4,4"), 7.75 (d, J=7.8 Hz, 2H, Ph-H), 7.73 (d, J=8.0 Hz, 2H, Ph-H), 7.48 (ddd, J=7.5, 4.8, 1.1 Hz, 2H, tpy-H5,5"); ESI-MS (m/): calcd. for [C$_{21}$H$_{16}$BN$_3$O$_2$+H]$^+$: 354.1314; found: 354.1366

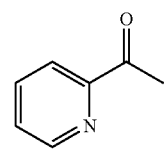

1

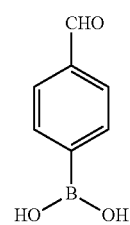

2

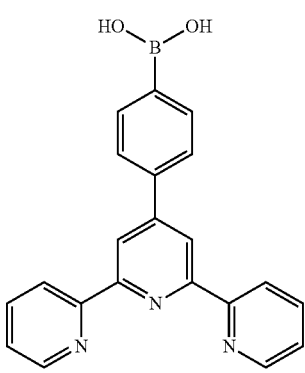

Example 6. Synthesis of Ph-TPy

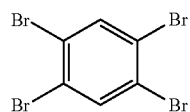

4

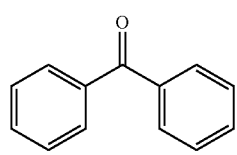

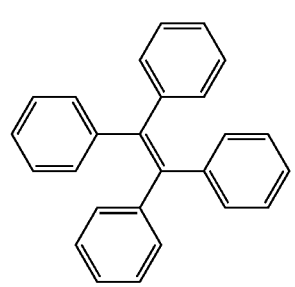

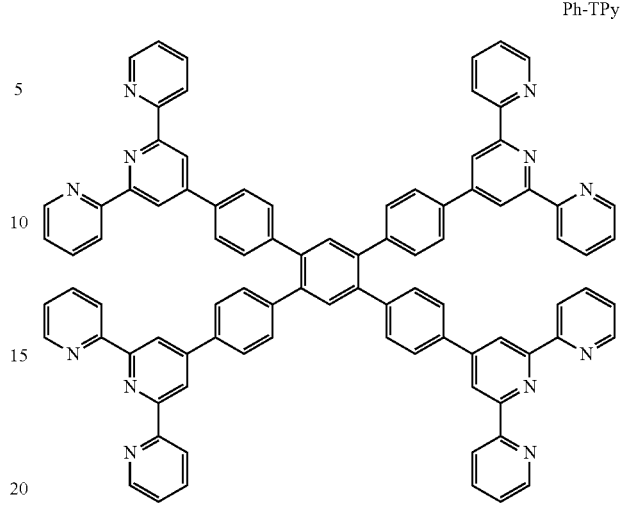

Tetrabromobenzene 4 (100 mg, 0.25 mmol), boronic acid 3 (538 mg, 6 eq), Pd(PPh$_3$)$_2$Cl$_2$ (53.7 mg, 0.3 eq) and Na$_2$CO$_3$ (806 mg, 30 eg) were added to a glass pressure tube. After 3 argon/evacuation cycles, H$_2$O (10 mL), toluene (30 mL) and tert-butyl alcohol (1.5 mL) were added under a flow of argon. The pressure tube was sealed and the mixture was stirred at 110° C. for 6 days. After cooling to room temperature, the mixture was extracted with chloroform (50 mL×2). The combined organic extracts was washed with brine, dried over Na$_2$SO$_4$ and concentrated in vacuo. The crude product was purified by column chromatography on silica gel using CHCl$_3$/MeOH (9:1) as eluent to afford the ligand Ph-TPy as a white solid. Yield: 66 mg, 20%. $^1$H NMR (500 MHz, CDCl$_3$, 300 K) δ: 8.70 (s, 8H), 8.63 (d, J=4.6 Hz, 8H), 8.58 (d, J=8.0 Hz, 8H), 7.8-7.70 (m, 16H), 7.67 (s, 2H), 7.41 (d, J=8.3 Hz, 8H), 7.25-7.23 (m, 8H). $^{13}$C NMR (125 MHz, CDCl$_3$, 300K) δ: 155.30, 154.89, 148.72, 140.58, 138.49, 135.86, 135.77, 132.03, 129.46, 122.70, 120.29, 117.78. ESI-MS (m/z): calcd. for [C$_{90}$H$_{58}$N$_{12}$+H]$^{2+}$: 654.7471; found: 654.7465.

Example 7. Synthesis of 1,1,2,2-Tetraphenylethylene 6

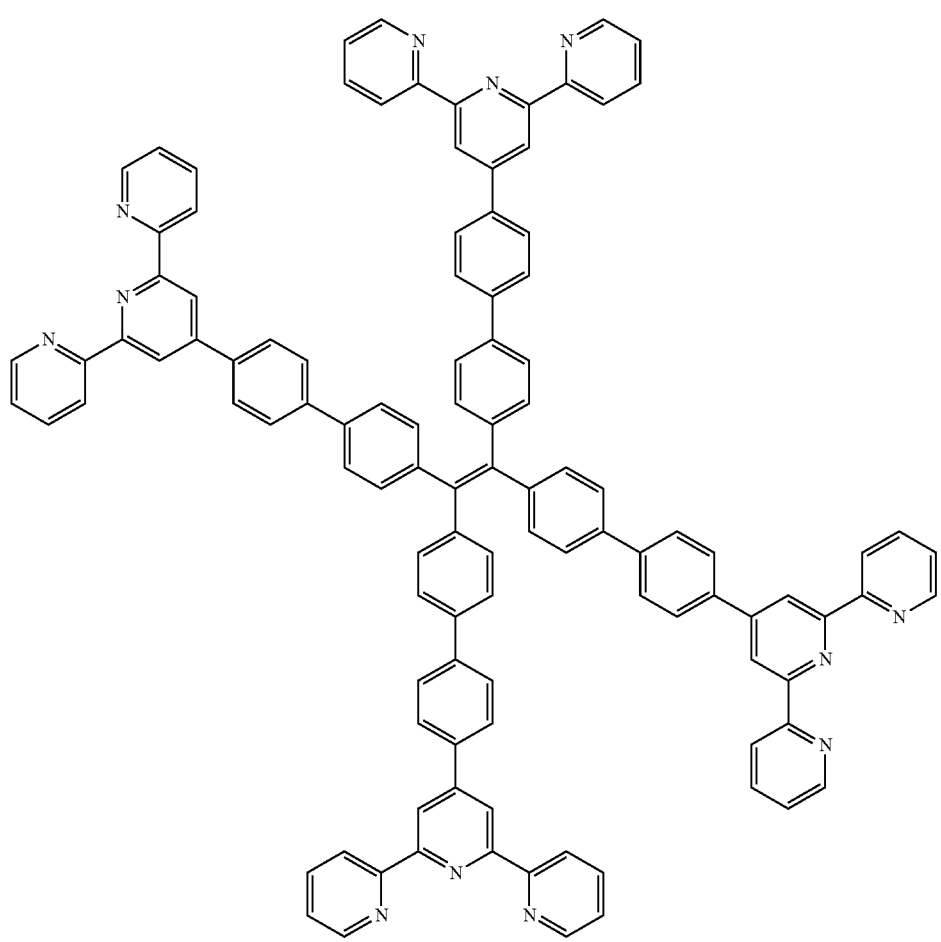

TPE-TPy

An ice-cold suspension of zinc powder (6.259 g, 0.095 mol) in dry THF (80 mL) was prepared in a 3-necked flask under argon. TiCl$_4$ (15 mL, 0.055 mol) was injected slowly over a period of 30 min, the ice-salt-water bath was removed and the reaction mixture was heated under reflux for 4 h. A solution of benzophenone 5 (5.00 g, 0.027 mol) in dry THF (20 mL) was added slowly using a syringe and mixture was refluxed overnight. The reaction mixture was cooled to room temperature and was quenched with a saturated solution of sodium carbonate (until the effervescence stopped) and was then extracted with chloroform (100 mL×3). The organic layer was washed with water (120 mL×3) and the combined organic extracts was dried over sodium sulfate and the solvent was evaporated under reduced pressure. The resulting crude product was purified by column chromatography on silica gel using hexane as eluent. Yield: 4.43 g, 49%. $^1$H NMR (500 MHz, CDCl$_3$, 300 K) δ: 7.05-7.00 (m, 12H), 6.98-6.94 (m, 8H). ESI-MS (m/z): calcd. for [C$_{36}$H$_{20}$+Na]$^+$: 332.1463; found: 355.1467.

Example 8. Synthesis of 1,1,2,2-tetrakis(4-bromophenyl)ethane 7

Tetraphenylethylene 6 (1.66 g, 5 mmol) was dissolved in CH$_2$Cl$_2$ (100 mL) in a round bottom flask and then Br$_2$ (3.0 mL) was added dropwise. The mixture was stirred at room temperature for 12 h, and the reaction was quenched by aqueous Na$_2$S$_2$O$_3$ (20 mL). The mixture was then extracted using CH$_2$Cl$_2$ (50 mL×3). The organic layer was washed with water (60 mL×3) and the combined organic extracts was dried over MgSO$_4$. The solvent was evaporated in vacuo and the residue was purified by column chromatography over silica gel using hexane as eluent. Compound 7 was obtained as a white powder. Yield: 3.05 g, 95%. $^1$H NMR (500 MHz, CDCl$_3$, 300 K) δ: 7.19 (d, J=8.2 Hz, 8H), 6.77 (d, J=8.2 Hz, 8H).

Example 9. Synthesis of TPE-TPy 1,1,2,2-tetrakis(4-bromophenyl)ethene 7 (100 mg, 0.15 mmol), boronic acid 3 (327 mg, 0.92 mmol). Pd(PPh$_3$)$_2$Cl$_2$ (32 mg, 0.046 mmol) and Na$_2$CO$_3$ (490.6 mg, 4.62 mmol) were added to a glass pressure tube. After 3 argon/evacuation cycles, H$_2$O (10 mL), toluene (30 mL) and tert-butyl alcohol (1.5 mL) were added under a flow of argon. The pressure tube was sealed and the mixture was stirred at 110° C. for 6 days. After cooling to room temperature, the mixture was extracted with CHCl$_3$ (50 mL×2). The combined organic extracts was washed with brine, dried over Na$_2$SO$_4$, and concentrated in vacuo. The crude product was purified by column chromatography on silica gel using CHCl$_3$/MeOH (9:1) as eluent to afford the TPE-TPy as a white solid. Yield: 68 mg, 28%. $^1$H NMR (500 MHz, CDCl$_3$, 300 K) δ: 8.78 (s, 8H), 8.74 (s, 8H), 8.68 (d. J=7.7 Hz, 8H), 7.99 (d, J=7.3 Hz, 8H), 7.88 (t, J=7.9 Hz, 8H), 7.79-7.72 (m. 8H), 7.56-7.50 (m, 8H). 7.39-7.27 (m, 16H). $^{13}$C NMR (125

MHz, CDCl$_3$, 300K) δ: 155.32, 154.98, 148.14, 138.27, 137.53, 135.84, 130.96, 126.70, 126.35, 125.50, 122.79, 120.38, 117.68, 113.04. MALDI TOF: calcd. for [C$_{110}$H$_{72}$N$_{12}$]: 1561.60; found: 1561.69.

Example 10. Synthesis of Thio-TPy

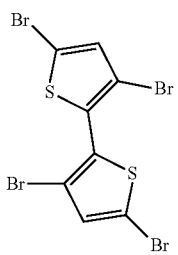

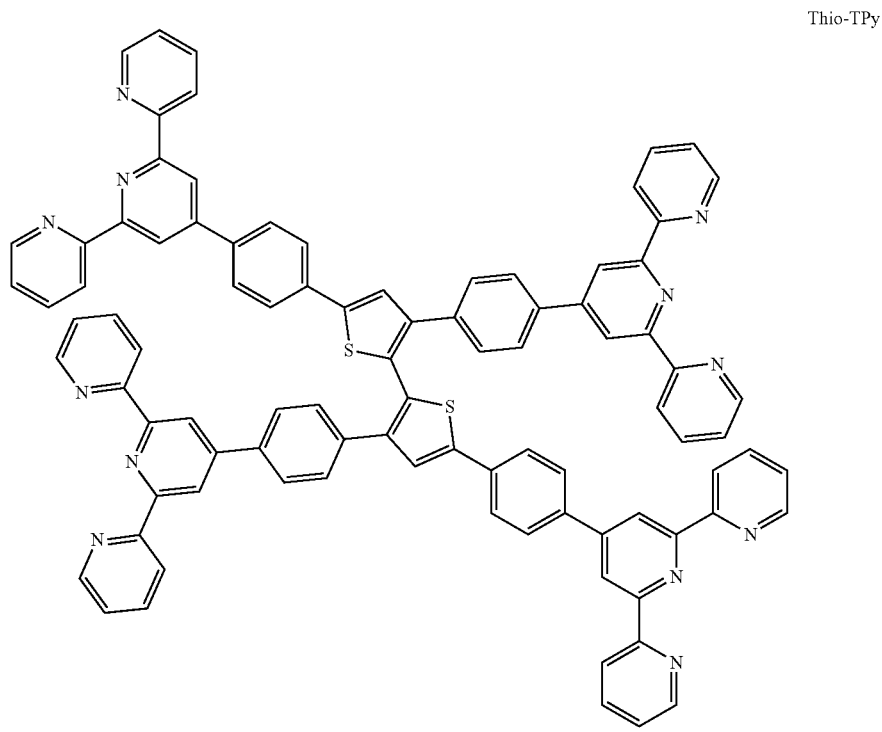

Thio-TPy 3,3',5,5'-Tetrabromo-2,2'-bithiophene 8 (100 mg, 0.207 mmol), boronic acid 3 (438 mg, 1.24 mmol), Pd(PPh$_3$)$_2$Cl$_2$ (43 mg, 0.062 mmol) and Na$_2$CO$_3$ (658 mg, 6.21 mmol) were added to a glass pressure tube. After 3 argon/evacuation cycles, H$_2$O (10 mL), toluene (30 mL) and tert-butyl alcohol (1.5 mL) were added under a flow of argon The pressure tube was sealed and the mixture was stirred at 110° C. for 6 days. After cooling to room temperature, the mixture was extracted with chloroform (50 mL×2). The combined organic extracts was washed with brine, dried over Na$_2$SO$_4$, and concentrated in vacuo. The crude product was purified by column chromatography on silica gel using CHCl$_3$/MeOH (9:1) as eluent to afford the product Thio-TPy as a white solid. Yield: 56 mg, 17%. $^1$H NMR (500 MHz, CDCl$_3$, 300 K) δ: 8.78 (s. 8H), 8.74 (s, 8H), 8.68 (d. J=7.7 Hz, 8H), 7.99 (d. J=7.3 Hz, 8H), 7.88 (t, J=7.9 Hz. 8H), 7.79-7.72 (m, 8H), 7.56-7.50 (m, 8H), 7.39-7.27 (i, 16H). $^{13}$C NMR (125 MHz, CDCl$_3$, 300K) δ: 155.32, 154.98, 148.14, 138.27, 137.53, 135.84, 130.96, 126.70, 126.35, 125.50, 122.79, 120.38, 117.68, 113.04. MALDI TOF: calcd. for [C$_{110}$H$_{72}$N$_{12}$]: 1395.44; found: 1395.85.

8

Example 11. Synthesis of the Metallosupramolecular Polymers for Spray Coating

A solution of FeCl$_2$·4H$_2$O (4.97 mg, 2 equiv.) in MeOH was added to a solution of the corresponding ligand (Ph-TPy: 6.5 mg, TPE-TPy: 7.8 mg, Bihio-TPy: 6.97 mg) in CHCl$_3$ (5 mL). The final concentration of the metallosupramolecular polymers was 0.3 mM and the freshly prepared solutions were used to spray coated on FTO-glass substrates using the automated spray coater without further purification.

Example 12. Fabrication of MPNFs by Spray Coating the MPs on FTO Substrates

FTO glass substrates (3 cm×3 cm) were cleaned by washing in soap solution followed by ultrasonication in water, acetone and isopropyl alcohol, each for 15 min. Spray coating was done using Nordson EFD EV Series automated dispensing system that dispenses fluids in a pre-programmed pattern onto a workpiece. Programs were created using the DispenseMotion™ software. A line speed of 150 mm/s and a ptp speed of 200 mm/s were used. Ten sprays of 0.3 mM solutions of the MPs are considered as one deposition step.

Example 13. Fabrication of Electrochromic Devices

FTO glass substrates (3 cm×3 cm, for counter/reference electrodes) were cleaned by washing with soap solutions followed by ultrasonication in water, acetone and isopropyl alcohol, each for 15 min. The MPNF-modified FTO substrates (3 cm×3 cm) were rinsed in dry acetonitrile and dried under a flow of argon. The bare FTO substrates were placed on top of these modified substrates and was held tight with an insulating 2-sided gorilla tape (thickness<200 μm) at each end to prevent short circuits as well as to hold the setup together. The gel electrolyte was then injected using a syringe to form a sandwich type architecture and was dried in an air oven at 60° C. for 10 min. The sandwich-cells were then sealed. The ends were connected to a potentiostat/galvanostat and the electrochromic properties of the solid-state set-up were studied.

Table 1 illustrates a comparative electrochromic performance of the functional gel electrolyte.

|  | Device w/o Additive | Device with Additive |
| --- | --- | --- |
| Response time for coloration, $t_c$ | 6.4 s | 1.6 s |
| Response time for bleaching, $t_b$ | 3.0 s | 1.2 s |
| Coloration Efficiency, $\eta$ | 112 cm$^2$/C | 211 cm$^2$/C |

Advantages of the Invention

Non-corrosive: Acid electrolytes result in corrosion of electrochromic layers
Cost-effective: Many reported electrolytes are highly expensive to produce
Generic to inorganic or hybrid electrochromic devices
Better performance parameters
High ionic conductivity
Electrochemically inactive
>90% transparency in the UV-vis-NIR spectral range
Wide electrochemical window of operation (−3 V-+3 V)
Low volatility
Cost effective
Faster switching (3× faster than conventional electrolytes).
High coloration efficiency (2× higher CE than conventional electrolytes).

We claim:
1. A transparent gel electrolyte comprising:
   (i) a polymeric gelling agent;
   (ii) a solvent;
   (iii) an additive and;
   (iv) an ionic conductor;
   wherein
     the weight composition ratios of solvent, polymeric gelling agent, additive and ionic conductor is in the range 20:2:1:2 to 2000:200:1:20;
     the solvent is selected from the group consisting of water, a mixture of water and alcohol (R—OH), and water and DMSO; wherein R is $C_{1-12}$ alkyl;
     the molecular weight of the polymeric gelling agent is in the range of 89,000-98,000;
     the ionic conductor is selected from a salt of lithium or ammonium cations; and
     the additive is molecular iodine.
2. The transparent gel electrolyte as claimed in claim 1, wherein the amount of alcohol or DMSO does not exceed 25% of the amount of water.
3. The transparent gel electrolyte as claimed in claim 1, wherein polymeric gelling agent used is poly-vinyl alcohol (PVA).
4. The transparent gel electrolyte as claimed in claim 1, wherein the anion of the ionic conductor is selected independently from the group consisting of halides (F$^-$, Cl$^-$, Br$^-$, I$^-$), bis(trifluoromethane)sulphonamides [N(CF$_3$SO$_2$)$_2$], perchlorates (ClO$_4^-$), alkoxides (OR), carboxylates (RCOO$^-$), hexafluorophosphate (PF$_6^-$), and CF$_3$(CF$_2$)$_n$SO$_3^-$ (triflates), wherein R is $C_{1-12}$ alkyl.
5. A process for the synthesis of the transparent gel electrolyte of claim 1 comprising the steps of:
   (i) mixing solvent, a polymeric gelling agent, an additive and an ionic conductor at 2000:200:1:20 weight composition ratios followed by heating at temperature in the range of 60 to 90° C. for a period in the range of 5 to 24 hrs to obtain a mixture;
   (iii) cooling the mixture obtained in step (i) followed by drying by freeze thawing (thrice for 1 h each), storing at room temperature in the range of 25 to 30° C.
6. A sandwich cell device comprising:
   (i) two conducting oxide-coated electrode substrates having electrically conductive surfaces; and
   (ii) an electrochromic active layer comprising of a redox active material having a predefined color, reversibly changeable upon subjecting to an electric field; and
   (iii) the transparent gel electrolyte as claimed in claim 1 sandwiched between the electrode substrates of (i) separated by an insulating tape as a spacer;
   wherein
     the electrochromic active layer is electrophoretically deposited oxides of first row transition metals with a general formula MO$_x$, where M is tungsten, vanadium or nickel and x>0 having a thickness of 100 nm-1200 nm; and/or
     the electrochromic active layer is spray or dip or spin coated oxides of first row transition metals with a general formula MO$_x$, where M is tungsten, vanadium or nickel and x>0 having a thickness of 500 nm-1200 nm; and/or
     the electrochromic active layer is spray or dip or spin coated metal-bipyridine, or metal-terpyridine complexes, with a general formula [M(py)$_n$]$^{m+}$mX$^-$ or [M(py)$_n$]$^{m+}$mX$^-$ and their coordination polymers, where py denotes a coordinating ligand as in bipyridine or terpyridine;
     wherein M is independently selected from the group consisting of Fe, Os, Ru, Ni, Co, and Cu;
     n and m are integers, each independently selected from 0-3, essentially n, m>0:
     X is an anion, independently selected from the group consisting of halides (F$^-$, Cl$^-$, Br$^-$, I$^-$), bis(trifluoromethane)sulphonamides [N(CF$_3$SO$_2$)$_2$], perchlorates (ClO$_4^-$), alkoxides (OR), carboxylates (RCOO$^-$), hexafluorophosphate (PF$_6^-$), and CF$_3$(CF$_2$)$_n$SO$_3^-$ (triflates); having a thickness of 60 nm-1000 nm.

7. The device as claimed in claim 6, wherein the substrates used are selected from the group consisting of doped/undoped glass, TCO (transparent conducting oxide) coated glass, silicon, quartz, metal, metal oxide, polymer, mica, clay, zeolite, plastic, ceramic, alumina, steel or any conducting substrate, in the form of sheets, columns or plates.

8. The device as claimed in claim 6, wherein the electrochromic active layer further comprises a monolayer of the same or different redox active materials, or a plurality of layers with the same or different redox active materials,
   wherein the redox active materials are independently chosen from the oxides of tungsten, vanadium or nickel, or metal-bipyridine, or metal-terpyridine complexes or their coordination polymers sandwiched between the conductive substrates along with the gel electrolyte-.

9. The device as claimed in claim 6, wherein the device exhibits coloration efficiency in the range of 200-2000 cm$^2$/C and a switching speed of 1-3 s.

10. A smart window, smart mirror, e-paper, smart display, helmet visor, smart ophthalmic glasses, optical data storage device, glare reduction set-up, heat and light transmission modulator, or integrated charge storage device comprising the device of claim 6.

* * * * *